United States Patent [19]
Galliger

[11] Patent Number: 6,019,927
[45] Date of Patent: Feb. 1, 2000

[54] METHOD OF CASTING A COMPLEX METAL PART

[76] Inventor: Nicholas Galliger, 2000 Sierra Trail, Xenia, Ohio 45385

[21] Appl. No.: 08/826,329

[22] Filed: Mar. 27, 1997

[51] Int. Cl.[7] .................. B22C 9/22; B22C 9/04
[52] U.S. Cl. ................ 264/221; 164/516; 164/35; 264/225; 264/226; 264/227; 264/DIG. 44
[58] Field of Search .................... 164/516, 35; 264/221, 264/225, 226, 227, DIG. 44

[56] References Cited

U.S. PATENT DOCUMENTS

| | | | |
|---|---|---|---|
| 2,495,276 | 1/1950 | Milton | 76/107 |
| 3,196,506 | 7/1965 | Operhall et al. | 22/196 |
| 3,933,190 | 1/1976 | Fassler et al. | |
| 4,231,413 | 11/1980 | Bretzger | |
| 4,520,541 | 6/1985 | Miki et al. | |
| 4,682,643 | 7/1987 | Bernhardt et al. | 164/34 |
| 4,966,225 | 10/1990 | Johnson et al. | 164/519 |
| 5,250,136 | 10/1993 | O'Connor | |
| 5,368,086 | 11/1994 | Kloskowski | 164/33 |
| 5,494,096 | 2/1996 | De Antonio Gonalons | 164/516 |

Primary Examiner—Jill L. Heitbrink
Assistant Examiner—Suzanne E. Mason
Attorney, Agent, or Firm—Jacox, Meckstroth & Jenkins

[57] ABSTRACT

A flexible and resilient positive pattern is made for a desired high temperature metal or ceramic part such as a gas turbine impeller having a complex geometry with walls defining undercut spaces, and the pattern with flexible walls is dipped into a ceramic molding media capable of drying and hardening. The pattern is removed from the media to form a ceramic layer on the flexible pattern, and the layer is coated with sand and air dried to form a ceramic layer. The dipping, sanding and drying operations are repeated several times to form a multiple layer ceramic shell. The flexible wall pattern is removed from the shell, by partially collapsing with suction if necessary, to form a first ceramic shell mold with a negative cavity defining the part and to provide for reusing the pattern. A second ceramic shell mold is formed on the first shell mold to define the back of the part and a pour passage, and the combined shell molds are fired in a kiln. A high temperature casting material is poured into the shell molds, and after the casting material solidifies, the shell molds are removed by breaking the molds.

5 Claims, 2 Drawing Sheets

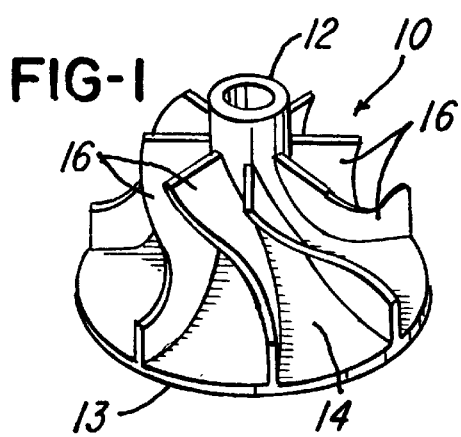
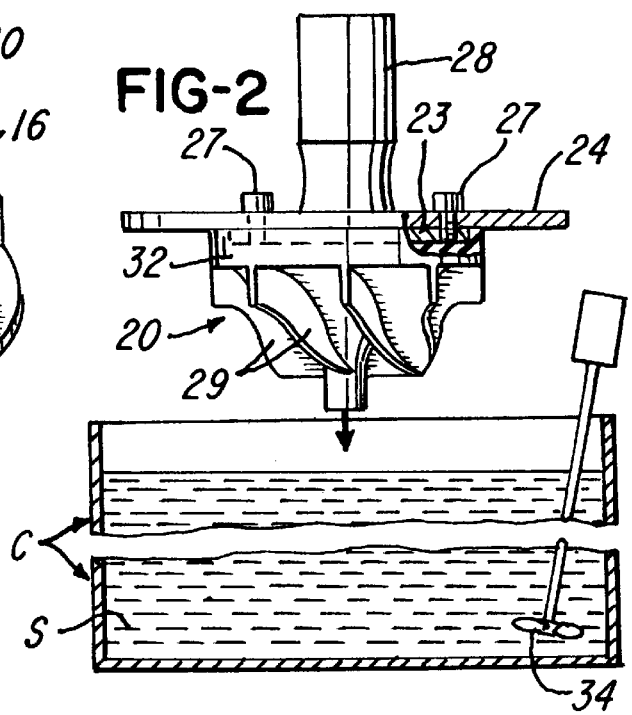
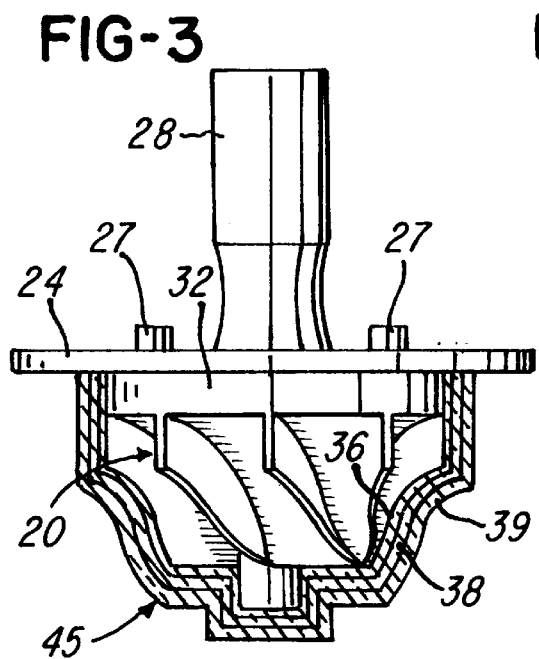
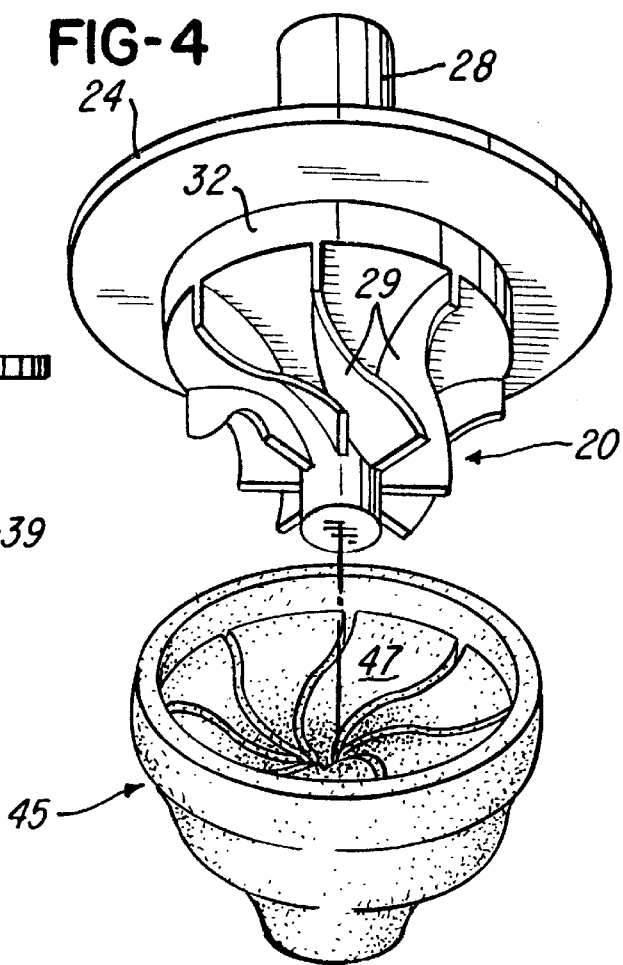

METHOD OF CASTING A COMPLEX METAL PART

BACKGROUND OF THE INVENTION

In the investment casting of high temperature casting materials to form parts of complex geometry with walls defining undercut recesses or spaces, such as, for example, complex ferrous impellers for use in gas turbines, it is common to first construct an aluminum hub mold and an aluminum single blade mold by machining solid aluminum. The molds are injected with melted wax to form a wax hub pattern and a wax pattern for each blade which has compound curves. Each of the wax blade patterns is positioned on the wax hub pattern using a fixture, and the wax blades are welded or fused by heat to the wax hub which also receives a preformed ceramic pour funnel.

The combined wax patterns and the pour funnel are then dipped into a ceramic slurry, removed from the slurry and coated with sand or vermiculite to form on the wax patterns a ceramic layer having permeability. The layer is dried, and the dipping, sanding and drying operations are repeated several times to create a multiple layer ceramic shell mold enclosing or encapsulating the combined wax patterns. The shell mold and wax patterns and the pour funnel are then placed within a kiln and fired to remove the wax and harden the ceramic shell mold and pour funnel.

A molten ferrous metal or high temperature casting material is poured into the shell mold, and after the material hardens, the shell mold is removed by destroying the mold and to form an impeller capable of withstanding high temperatures. Since all of the wax patterns and the shell mold are destroyed during the production of the impeller, there is substantial cost to produce a number of impellers, with the result that complex impellers produced by the above described investment casting method are not commonly used in the high volume production of gas turbines and turbochargers. Instead, such gas turbines and turbochargers use ferrous impellers with less efficient and simple blade geometry which may be simply cast without using the above investment casting method.

It is also known to cast or produce non-ferrous parts or impellers with either simple or complex blade geometry using a solid mold casting process. In this process, a flexible and resilient positive pattern is made of the part or impeller by placing a solid positive master pattern of the impeller into a suitable flask and then pouring a flexible and resilient material, such as silastic or platinum rubber material, over the master pattern. After the flexible material has cured, the solid master pattern of the impeller is removed from the flexible material to form a flexible mold with a reverse or negative cavity of the master pattern. A closed flask is then placed around the flexible mold of the master pattern, and a flexible and resilient curable material is poured into the cavity of the reverse mold. After the flexible and resilient material cures to form a positive flexible pattern of the impeller, the positive flexible pattern is removed from the flexible negative mold to form a positive flexible pattern of the impeller.

The flexible pattern is then placed in an open top metal flask, and foundry plaster is poured into the flask. After the plaster has set up, the positive flexible pattern is removed from the plaster, leaving a negative plaster mold. The flask is removed from the plaster mold which is dried to remove moisture, and a non-ferrous molten material is poured into the plaster mold. After the non-ferrous molten material solidifies and cools, the plaster is removed and destroyed to produce a positive non-ferrous reproduction of the original part or impeller. This casting process is used for non-ferrous or lower temperature casting materials and cannot be used for producing parts of high temperature casting materials such as ferrous metals and titanium.

SUMMARY OF THE INVENTION

The present invention is directed to an improved investment casting process or method which is ideally suited for high volume production of parts of complex geometry and of a high temperature resisting material such as a ferrous metal or titanium impeller having a complex geometry with walls or blades defining undercut spaces. The investment casting method of the invention may also be used for casting or producing non-ferrous parts having simple or complex geometry, especially when it is desirable for the part to have precision dimensions and surfaces as provided by a ceramic investment casting process.

In accordance with one embodiment of the invention for producing, or example, a gas turbine impeller, a positive flexible and resilient pattern is made of the part or impeller using the method steps as described above for casting a non-ferrous part and using a flexible and resilient material such as silastic or platinum rubber material. The positive flexible impeller is mounted on a metal disk which is attached to a back plate with a projecting handle. With a larger impeller, the flexible pattern may be provided with a cavity which is adapted to receive a vacuum. The flexible pattern is dipped into a ceramic molding media multiple times, such as 5–9 dips, and after each dip, sand is coated on the ceramic molding media, and the dip layer is allowed to air dry. The repetitive dipping, sanding and drying operations produce a multiple layer ceramic shell mold of sufficient thickness to support the ferrous casting material.

The flexible pattern of the Impeller is removed from the shell mold by pulling the pattern out of the mold, which results in flexing the walls of the pattern. With a flexible pattern for a large impeller, a partial vacuum may be pulled within the center cavity of the flexible pattern to aid in collapsing the pattern inwardly for withdrawing the pattern from the shell mold cavity.

A machined or injection molded wax pattern having an outer surface conforming to a sprue opening and the back plate for the impeller, is attached by adhesive to the ceramic shell mold, and the wax pattern and shell mold are again dipped and redipped with sanding and air drying between each dip. The combined ceramic shell molds are then placed in a kiln and fired to remove the wax and for drying and hardening the shell molds. A molten ferrous metal or titanium is then poured into the combined shell molds, and after the metal solidifies, the combined ceramic molds are removed, leaving a cast ferrous or titanium reproduction of the original impeller. After the flexible pattern is removed from the ceramic shell mold, the pattern may be reused to produce many additional shell molds and thus many cast reproductions of the impeller.

Other features and advantages of the invention will be apparent from the following description, the accompanying drawings and the appended claims.

BRIEF DESCRIPTION OF THE DRAWINGS

FIG. 1 is a perspective view of a ferrous metal impeller of complex geometry and illustrating a typical part produced by the investment casting method of the invention;

FIG. 2 is a diagrammatic elevational view, in part section, illustrating the dipping of a flexible pattern of the impeller shown in FIG. 1 into a ceramic slurry;

FIG. 3 is a section of a multiple layer ceramic shell mold formed on the flexible pattern using the dipping operation shown in FIG. 2;

FIG. 4 is an exploded perspective view of the flexible pattern and the ceramic shell mold after the pattern has been removed from the mold;

DESCRIPTION OF THE PREFERRED EMBODIMENT

Figure 5:
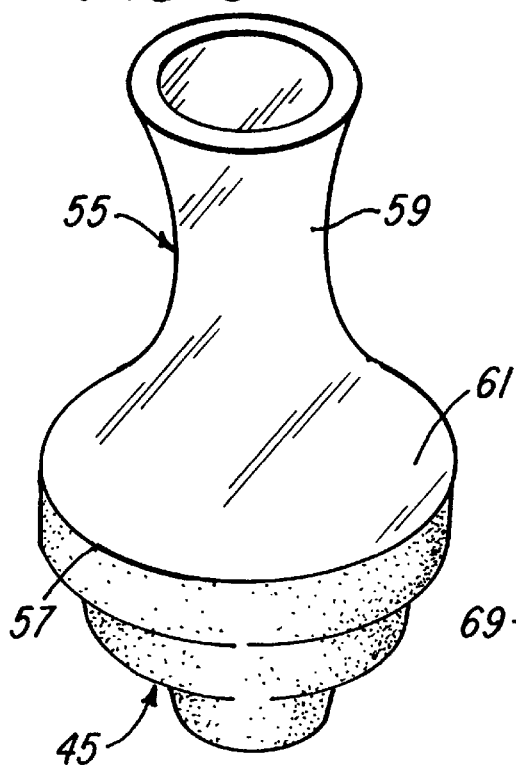
FIG. 5 is a perspective view of the ceramic shell mold shown in FIG. 4 with an attached hollow wax mold for defining a back plate cavity and a pour passage.

For purpose of illustrating the method steps of the invention, FIG. 1 illustrates a gas turbine impeller 10 which has a complex blade geometry and produced in a ferrous material by the investment casting method of the invention. The impeller 10 includes an annular hub 12 which extends to form a circular base or back plate 13 having a curved upper surface 14. A series of peripherally spaced thin walled blades 16 are cast as an integral part of the impeller 10, and each blade has a compound curve and defines an undercut recess or space between the outer portion of the blade and the surface 14. It is understood that the impeller 10 is shown and described herein for purpose of illustrating a typical part of complex geometry and which cannot be produced in a ferrous material by a simple casting process. However, the method may be used for producing many other parts, especially complex parts of high temperature materials such as titanium and ceramic.

Referring to FIGS. 2–4 the investment casting method of the invention includes the steps of first making a flexible and resilient rubber-like positive pattern 20 of the part or impeller 10, and the positive flexible pattern 20 is constructed as mentioned above by first either machining a positive solid master impeller or producing a solid master impeller by 3D stereolithography. The master impeller is placed within a suitable flask, and a silastic, platinum rubber, urethane or other similar material is poured into the flask to cover the solid master impeller. After the flexible material has cured, the master impeller is removed from the flexible mold leaving a reverse or negative cavity corresponding to the solid master impeller. The flexible negative mold is placed within a flask, and the flexible material is poured into the cavity of the flexible negative mold and allowed to cure. The flexible positive pattern 20 is then removed from the flexible negative mold.

Referring to FIG. 2, the flexible pattern 20 may be provided with a central vacuum cavity (not shown) and is preferably formed around a circular mounting plate 23 having peripherally spaced threaded holes. The flexible pattern 20 is mounted on a larger parting plate 24 and secured by a set of screws 27, and a handle member 28 projects upwardly from the parting plate 24. The flexible pattern 20 has thin flexible walls 29 corresponding to the blades 16 which project from a circular base 32. The base 32 projects downwardly from the parting plate 24 by a distance corresponding to a desired thickness of the impeller base plate 13 plus the thickness of the additional metal desired for machining the bottom surface of the impeller.

By gripping the handle 28, the flexible pattern 20 is manually or mechanically dipped into a slurry S of ceramic material which is circulated within a container C by means of a motor driven agitator 34. The pattern 20 is dipped until the parting plate 24 contacts the surface of the ceramic slurry S. The pattern 20 is then lifted from the slurry which results in a first ceramic layer 36 forming on the outer surfaces of the pattern 20. After the first dipping operation, sand is coated onto the slurry layer 36, and the layer is allowed to air dry to form a thin gas permeable ceramic shell layer on the flexible pattern 20. The dipping, sanding and drying operations are repeated to form a second ceramic shell mold layer 38 and a third ceramic shell mold layer 39. Preferably, the dipping, sanding and drying operations continue for five to nine dips to form a multiple layer ceramic shell mold 45 on the flexible pattern 20.

After the last ceramic layer of the shell mold 45 is dry, the parting plate 24 is cleaned off around the shell mold 45, and then the flexible pattern 20 is physically pulled out of the shell mold 45, causing the curved walls 29 to flex. With larger parts or impellers, a vacuum may be applied to the cavity within the flexible pattern 20 to cause slight inward collapsing of the pattern and thereby permit easier removal of the flexible pattern from the ceramic shell mold 45. After the flexible pattern 20 is removed from the ceramic shell mold 45 (FIG. 4), the mold 45 defines a negative mold cavity 47 which corresponds into the precise shape of the flexible pattern 20. The pattern 20 may then be used to form another ceramic shell mold.

Figure 6:
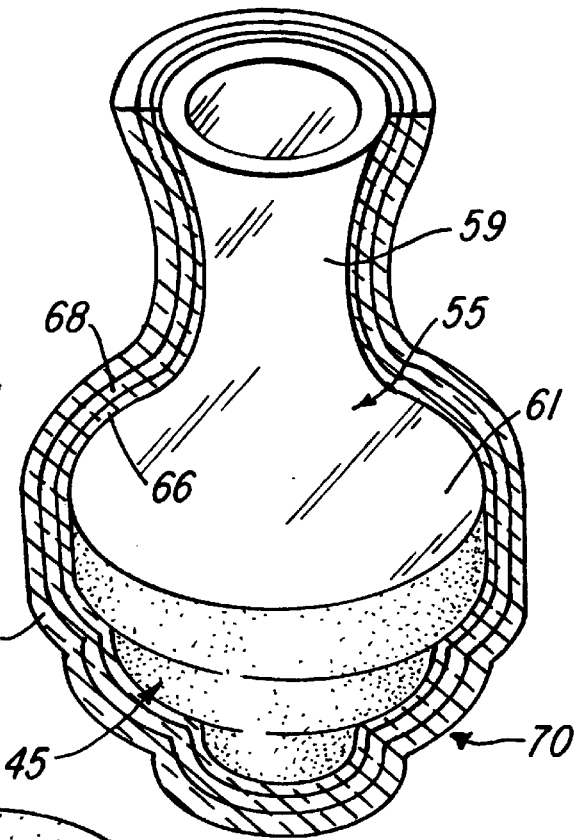
FIG. 6 illustrates the ceramic shell mold and wax mold of FIG. 5 with a surrounding multiple layer ceramic shell mold formed by dipping the assembly of FIG. 5 into the ceramic slurry.
Figure 7:
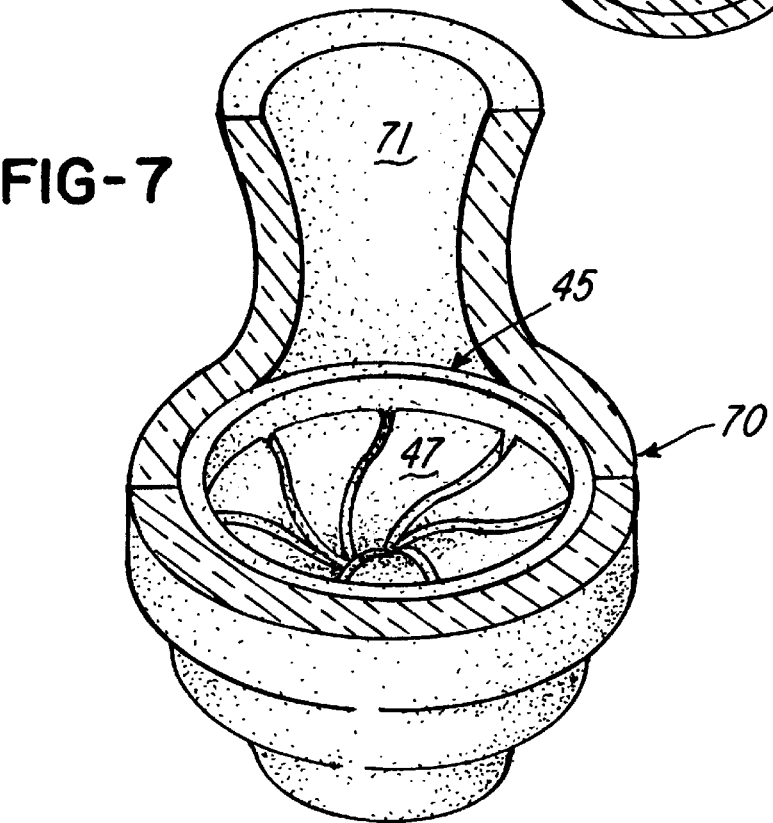
FIG. 7 is a perspective view of the surrounding multiple layer ceramic shell mold with a portion broken away and after the wax mold has been removed.

Referring to FIGS. 5–7, a pouring spout and base plate mold 55 is formed from a wax material by machining or injection molding the wax into a metal mold cavity, and the bottom flat surface of the mold 55 is attached to the upper surface of the ceramic shell mold 45 at the interface 57 by a suitable adhesive such as a latex adhesive. The mold 55 has an outer surface 59 which defines a metal pouring passage and a base 61 which defines a back plate for the impeller to be cast within the shell mold 45.

The wax mold 55 and the attached shell mold 45 are then dipped into the ceramic slurry S, removed from the slurry, coated with sand and allowed to air dry to form a first ceramic coating or layer 66 on the assembly of the molds 45 and 55. The dipping, sanding and drying operations are repeated, preferably from three to five times, to add additional coatings and layers 68 and 69 over the first layer 66, thereby forming a multiple layer ceramic mold 70 overlying the multiple layer shell mold 45 and the wax mold 55. The mold 70 is then placed within a kiln and fired to remove the wax mold 55 and to dry and harden the multiple layer ceramic mold 70.

After the mold 70 is removed from the kiln, it is ready to receive a molten ferrous metal or other high temperature casting material which is poured into the cavity defined by the shell molds 45 and 70 through a passage 71 as defined by the outer surface 59 of the wax mold 55. Since the shell molds 45 and 70 are ceramic, the molten material may be a high temperature material such as titanium or a ferrous metal or a ceramic material, all of which are cast at a temperature substantially higher than the temperature for casting a non-ferrous metal. The ceramic shell mold 45 defines the blades and front surface of the impeller, and the lower inner surface of the ceramic shell mold 70 defines the base or back plate for the impeller. After the casting material solidifies and hardens, the shell molds 70 and 45 are removed by breaking the molds. The cast impeller is then machined to form the impeller 10 with the desired back plate 13 and to remove the sprue formed by the pour passage 71.

From the drawings and the above description, it is apparent that the investment casting process of the invention provides desirable features and advantages. For example, the casting method provides for casting a non-draftable part or impeller of complex geometry of a high temperature casting material and with a reusable flexible pattern. As a result, the cost for producing such a high temperature resisting part or impeller is substantially reduced. This permits, for example, a cast ferrous impeller with more efficient complex blade geometry to be used to produce lower priced and more efficient gas turbines and turbochargers where such impellers are highly desirable in the gas compressor section.

While the investment casting method herein described constitutes a preferred embodiment of the invention, it is to be understood that the invention is not limited to the precise method described, and that changes may be made therein without departing from the scope and spirit of the invention as defined in the appended claims.

The invention having thus been described, the following is claimed:

1. A method of producing an impeller of a high temperature casting material and having a complex geometry with curved blades defining undercut spaces, the method comprising the steps of forming a positive flexible pattern of the impeller with a curable resilient and flexible material to provide the pattern with flexible walls corresponding to the blades, dipping the flexible pattern into a liquid ceramic molding media capable of drying and hardening, removing the flexible pattern from the liquid ceramic molding media with a coated layer of the ceramic molding media, drying the layer of ceramic molding media on the flexible pattern to form a ceramic shell on the flexible pattern, repeating the dipping and drying steps to form a multiple layer ceramic shell on the flexible pattern, removing the flexible pattern from the ceramic shell by flexing the walls of the flexible pattern to form a first multiple layer ceramic shell mold defining a negative mold cavity corresponding to the impeller and to provide a reusable flexible pattern, forming a second pattern defining a back plate surface for the impeller and a sprue passage, dipping the second pattern into a liquid ceramic molding media, removing the second pattern from the liquid ceramic molding media with a coated layer of the ceramic molding media on the second pattern, drying the layer of ceramic molding media to form a ceramic shell on the second pattern, and repeating the dipping and drying steps to form a multiple layer ceramic shell on the second pattern to form a second multiple layer ceramic shell mold, connecting the second ceramic shell mold to the first ceramic shell mold, removing the second pattern from the second mold, pouring the casting material into the negative mold cavity of the first ceramic shell mold through the sprue passage within the second ceramic shell mold and allowing the casting material to harden to form a multiple blade impeller with a back plate, and removing the first and second shell molds from the impeller.

2. A method as defined in claim 1 and including the step of forming an internal cavity within the flexible pattern, and developing a suction within the internal cavity for partially collapsing the flexible pattern to facilitate removing the flexible pattern from the ceramic shell mold.

3. A method as defined in claim 1 wherein the step of forming a positive flexible pattern of the impeller, comprises the steps of forming a rigid positive master of the impeller, placing the master in a flask, pouring a curable resilient material into the flask to cover the master, removing the rigid master from the resilient material after the material is cured to form a negative cavity of the master in the resilient material, pouring a curable flexible material into the negative cavity, and allowing the curable flexible material to cure to form the flexible pattern.

4. A method of producing an impeller of a high temperature casting material and having a complex geometry with curved blades defining undercut spaces, the method comprising the steps of forming a positive flexible pattern of the impeller with a curable resilient and flexible material to provide the pattern with flexible walls corresponding to the blades, dipping the flexible pattern into a liquid ceramic molding media capable of drying and hardening, removing the flexible pattern from the liquid ceramic molding media with a coated layer of the ceramic molding media on the flexible pattern, drying the layer of ceramic molding media to form a ceramic shell on the flexible pattern, repeating the dipping and drying steps to form a multiple layer ceramic shell on the flexible pattern, removing the flexible pattern from the ceramic shell by flexing the walls of the flexible pattern to form a first multiple layer ceramic shell mold defining a negative mold cavity corresponding to the impeller and to provide a reusable flexible pattern, attaching to the first ceramic shell mold a wax pattern of the back plate surface and sprue passage, repeatedly dipping and drying the combined wax pattern and first ceramic shell mold to form a second multiple layer ceramic shell mold surrounding the wax pattern and the first ceramic shell mold, and then heating the second shell mold to remove the wax pattern and harden the second ceramic shell mold.

5. A method as defined in claim 4 and including the steps of coating a granular material on each layer of ceramic material after each dipping step and before each drying step to provide a ceramic shell having gas permeability and sufficient strength to receive and support the casting material.

* * * * *